(No Model.) 3 Sheets—Sheet 1.
G. W. GRIFFIN.
MACHINE FOR FINISHING WASHERS.
No. 324,682. Patented Aug. 18, 1885.
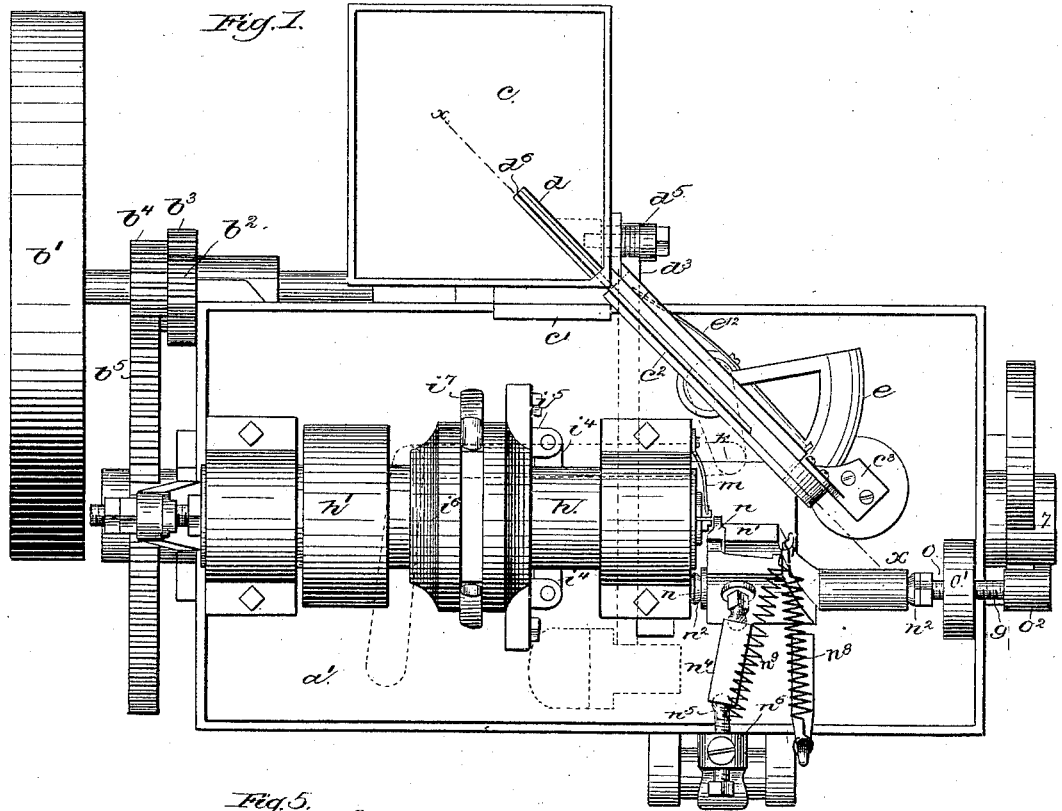
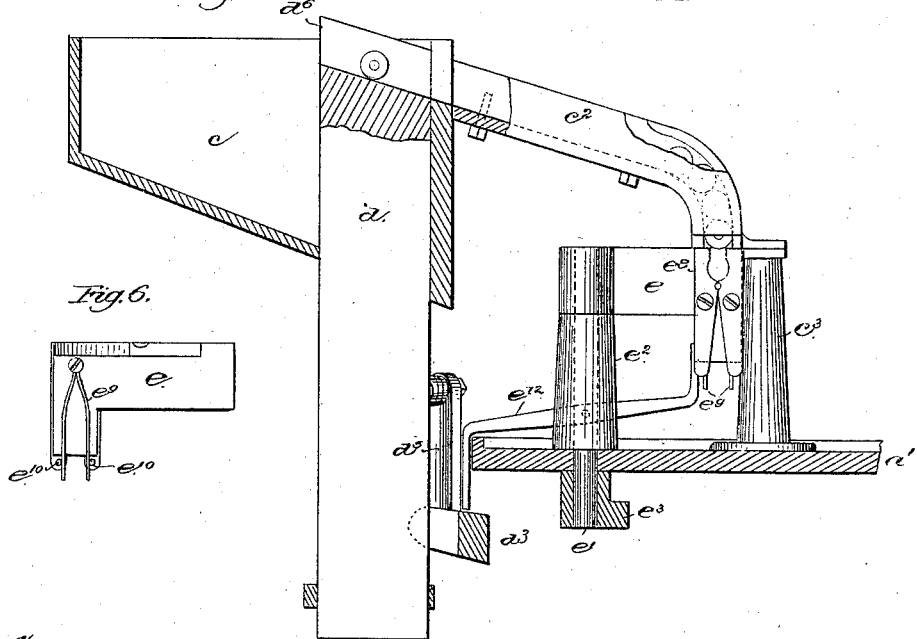

(No Model.) 3 Sheets—Sheet 2.
G. W. GRIFFIN.
MACHINE FOR FINISHING WASHERS.
No. 324,682. Patented Aug. 18, 1885.
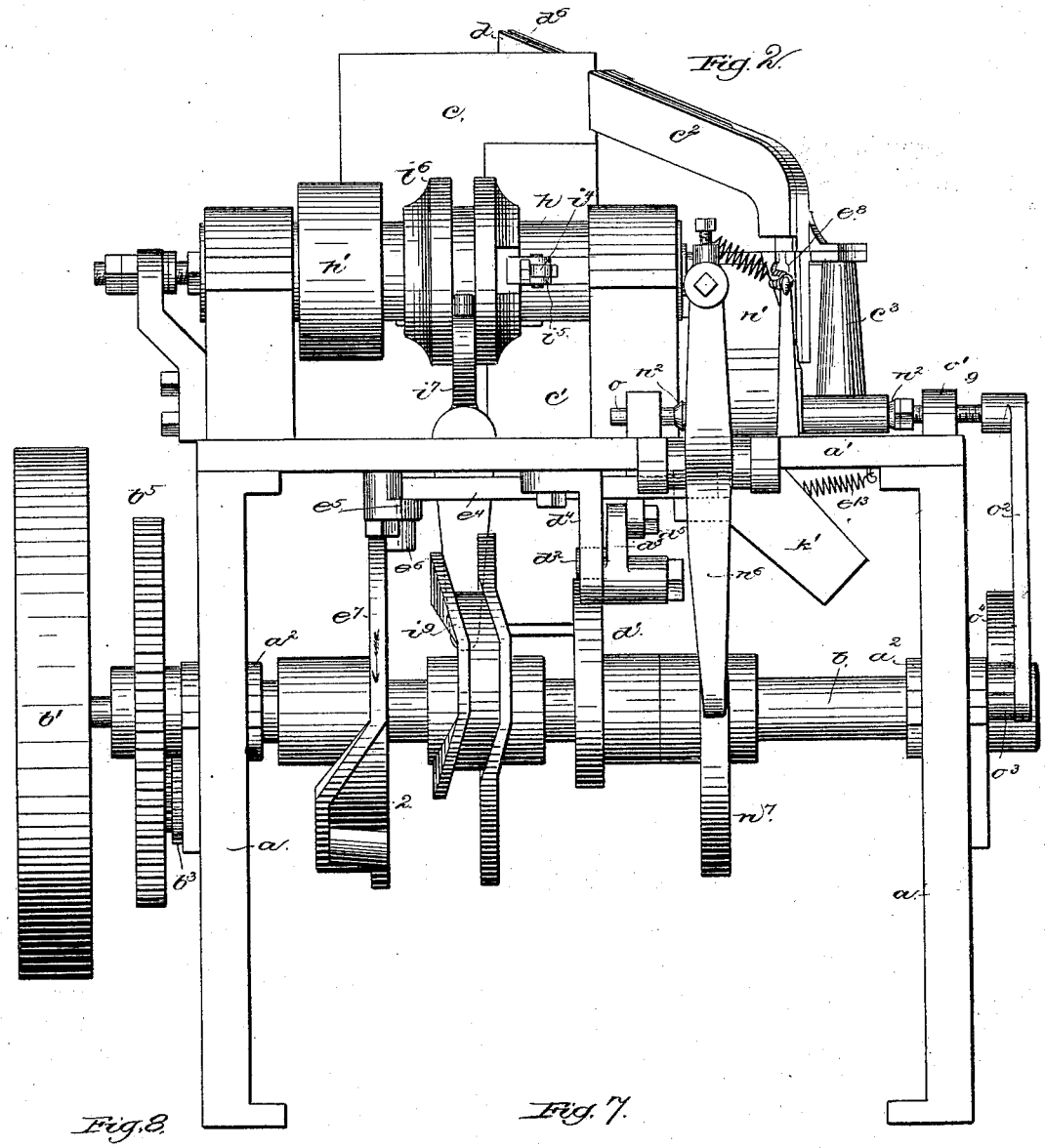
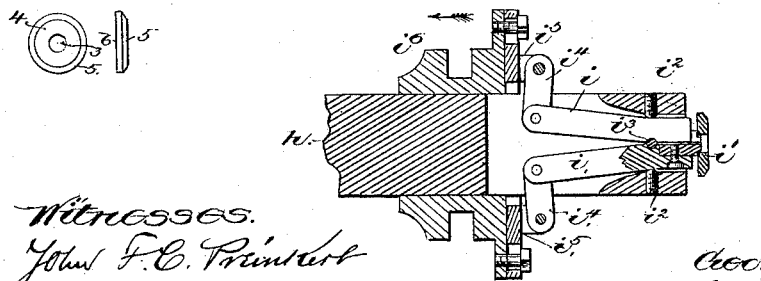

(No Model.) 3 Sheets—Sheet 3.

G. W. GRIFFIN.
MACHINE FOR FINISHING WASHERS.

No. 324,682. Patented Aug. 18, 1885.

UNITED STATES PATENT OFFICE.

GEORGE W. GRIFFIN, OF FRANKLIN FALLS, NEW HAMPSHIRE.

MACHINE FOR FINISHING WASHERS.

SPECIFICATION forming part of Letters Patent No. 324,682, dated August 18, 1885.

Application filed June 15, 1883. (No model.)

*To all whom it may concern:*

Be it known that I, GEORGE W. GRIFFIN, of Franklin Falls, county of Merrimac, State of New Hampshire, have invented an Improvement in Washer-Finishing Machines, of which the following description, in connection with the accompanying drawings, is a specification, like letters on the drawings representing like parts.

My invention has for its object to produce an organized machine for finishing the surfaces of metal washers, such as employed upon a bolt beneath the head of a nut.

The machine comprises the following elements or instrumentalities for automatically performing the different operations, namely: a hopper or receptacle containing the washers to be finished, a plunger to convey the said washers into a roadway or guide, through which they pass by the action of gravity, a transferring device at the lower end of the said roadway, in which the said washers are received one at a time, and a rotary spindle and a chuck or jaws to receive the washer from the transferring device, and a tool and means to feed it to the washer rotated by the said spindle. The different devices are operated at the proper times by suitable cams upon a cam-shaft; and the invention consists in the various combinations of the said elements and details of construction.

Figure 3:
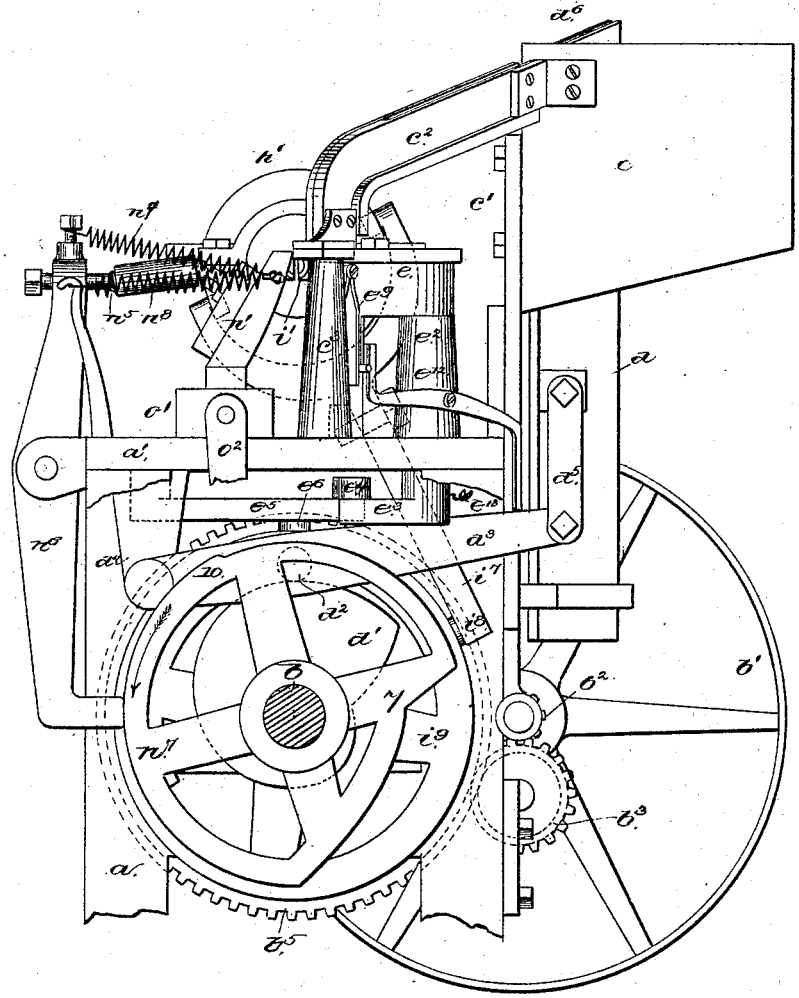
Figure 4:
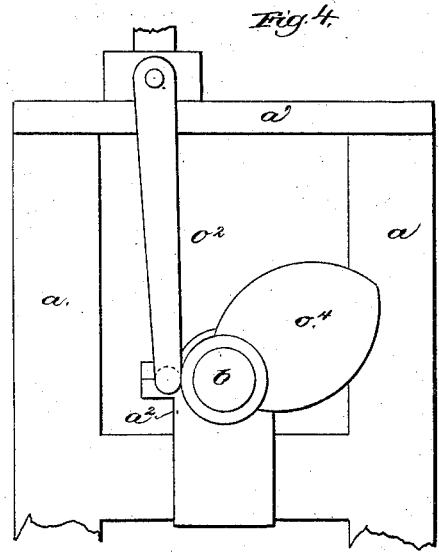

Figure 1 is a plan view of a machine for finishing washers embodying this invention; Fig. 2, a side elevation thereof; Fig. 3, an end elevation, the nearer portion of the framework and mechanism in front of it being removed; Fig. 4, a detail showing the parts that are removed in Fig. 3; Fig. 5, a vertical section on line $x$ $x$, Fig. 1; Fig. 6, a detail of the transferring device; Fig. 7, a sectional detail of the spindle and chuck or jaws for holding the washer that is being operated upon, and Fig. 8 a face and edge view of the finished washer.

The frame-work $a$, supporting a table, $a'$, is provided with bearings $a^2$ for the main cam-shaft $b$ below the said table. The said cam-shaft is actuated by a pulley, $b'$, driven by a suitable belt, and connected by suitable speed reducing gearing, $b^2$ $b^3$ $b^4$ $b^5$, with the said shaft $b$, upon which are mounted the cams by which the different devices are actuated at the proper times.

The washer-blanks to be finished, which consist of annular metallic rings or flat disks having central openings punched from sheet metal, are contained in a receptacle or hopper, $c$, supported on an upright, $c'$, above the table, and having a roadway, $c^2$, leading therefrom, through which the washers may roll or slide edgewise by the action of gravity to the lower end of the said roadway, which is supported on an upright, $c^3$, a short distance above the table. The blanks are conveyed to and placed edgewise in the said roadway by a plunger or conveying device, $d$, passing through an opening in the bottom of the hopper, and being moved upward and downward through the mass of washer-blanks therein by the actuating-cam $d'$, the surface of which engages a stud or roller, $d^2$, on a lever, $d^3$, pivoted in a lug, $d^4$, at the under side of the table $a'$, and connected by a link, $d^5$, with the lower end of the said plunger. This latter has at its upper end an inclined notch, $d^6$, that in moving upward will usually engage one or more of the washer-blanks and receive them edgewise, the said notch at the end of the upward movement of the plunger being brought in line with the roadway $c^2$, into which the said washer or washers picked up by the plunger will then roll.

The bottom of the receptacle $c$ is inclined downward toward the corner through which the plunger $d$ passes, thus facilitating the introduction of the washers therein, and the stud $d^2$ is kept upon the cam-surface by the weight of the plunger, which makes its downward movement under the action of gravity.

The washer-blanks are delivered one at a time from the lower end of the roadway $c^2$ into the transferring device, consisting of a segmental block, $e$, mounted on a rock-shaft, $e'$, pivoted in a post, $e^2$, on the table, and having a crank, $e^3$, below the table, connected by a link, $e^4$, with a lever, $e^5$, pivoted on the under side of the table $a'$, and having a stud, $e^6$, engaged by the cam $e^7$, the main portion of the periphery of which keeps the block $e$ in the position shown in the drawings.

The end of the block $e$ beneath the roadway $c^2$ is provided with a holding device, consisting of pivoted jaws $e^8$, normally held together by springs $e^9$, acting upon pins or projections $e^{10}$, one of which is engaged by a lever, $e^{12}$, pivoted upon the side of the part $e^2$, and operated by the lever $d^3$ near the end of the upward movement of the plunger $d$, to open the said jaws and permit the lowest washer-blank in the roadway to drop into the said jaws, which then engage it by the pressure of the springs $e^9$. When the depression 2 of the cam $e^7$ arrives opposite the projection $e^6$, the rock-shaft $e'$ is oscillated by the spring $e^{13}$, carrying the blank thus held by the jaws $e^8$ around to the chuck upon the spindle $h$, which is rotated at a high speed by the pulley $h'$, usually driven by a suitable belt from the same counter-shaft that actuates the cam-shaft. The lowermost blank and column of blanks in the roadway $c^2$ remain supported upon the block $e$, while the blank last removed from the said roadway is thus transferred to the spindle-chuck, and after the one thus transferred has been engaged and held by the chuck, as hereinafter described, the transferring device is moved back by the cam $e^7$ into position to receive a new blank between its jaws, it thus being removed sufficiently from the blank that is held upon the spindle to permit the cutter to act.

The chuck or holding device, by which the blank is automatically engaged and held on the spindle, consists, essentially, of two jaws or levers, $i$, provided with fingers $i'$, which are preferably detachable, so that different ones may be employed to fit different-sized blanks, the said fingers entering the central opening, 3, (see Fig. 8,) of the blank, and, when spread apart, holding it with sufficient firmness to remove it from the spring-pressed jaws $e^8$.

The jaws $i$, resting against fulcrum-pins $i^2$, and notched to engage a steadying pin or pivot, $i^3$, are connected by links $i^4$ with ears $i^5$, adjustably fixed upon a collar or sleeve, $i^6$, longitudinally movable on the spindle $h$, it being grooved to receive the forked end of a shipping-lever, $i^7$, provided with a stud or roller, $i^8$, operated by the cam $i^9$.

Just before the transferring device moves a blank up to the chuck or fingers $i'$, as before described, the cam $i^9$ operates the lever to move the sleeve $i^6$ in the direction of the arrow, Fig. 7, thus drawing the links $i^4$ more nearly into line with the levers $i$, and separating their ends connected with the said links by a toggle action, drawing the fingers $i'$ together, so as to release the washer held on them and permit it to be thrown off or detached by a forked spring, $m$, pressing against the rear side of the washer; and just after the washer last operated upon has been thus thrown off, and while the fingers are still held together, the transferring device presents a new blank, and the fingers are immediately separated to hold it before the transferring device is withdrawn by the cam $e^7$. The finished washers thus thrown off from the chuck fall through an opening, $k$, in the table $a'$, and are directed by a chute, $k'$, into a suitable receptacle. When the blank is thus held by the chuck with its face and edge exposed and rapidly rotated by the spindle, the cutter $n$, having a sectional shape corresponding with that desired for the washer and ground at its end to a sharp edge, is moved radially or laterally against the rotating washer to cut and finish its surface.

The cutter $n$ is held in a clamp or holder, $n'$, pivoted upon centers $n^2$, and provided with a stud, $n^3$, to receive one end of a bar, $n^4$, the other end of which receives a stud, $n^5$, adjustably fixed in a lever, $n^6$, operated by a cam, $n^7$, having a gradually-rising portion, by which the cutter is fed radially in upon the washer, and a recess or depression, 7, which permits the cutter to be withdrawn by the spring $n^8$ just before the washer is released and a new one transferred to the chuck, as before described.

A spring, $n^9$, holds the ends of the cutter-clamp and lever and the bar $n^4$ together, and by adjusting the stud $n^5$ the depth of action of the cutter on the washer may be regulated.

The washers usually are finished to the shape shown in Fig. 8—namely, having a flat face, 4, a beveled edge, 5, and a cylindrical periphery, 6—and in some instances it is desirable to move the cutter axially toward the washers to cut the face 4. This may be accomplished, when desired, by the following mechanism: The centers $n^2$ of the cutter-holder are mounted upon a spindle, $o$, which is threaded, as shown at 9, where it passes through one of its bearings, $o'$, on the table $a'$. The rocking movement of the cutter-holder upon the center $n^2$ is independent of the spindle $o$; but when the latter is rotated it carries the said centers and the cutter-clamp and cutter toward or from the spindle $h$ in the direction of its axis of rotation by the action of the screw-threads. The said spindle has connected with it an arm, $o^2$, provided with a stud or roller, $o^3$, resting on a cam, $o^4$, by which the said arm is rocked and the spindle rotated sufficiently to produce the requisite longitudinal movement of the spindle $o$ to feed the cutter against the face 4 of the washer. This movement takes place after the radial movement of the cutter caused by the cam $n^7$, by which the periphery and beveled edge of the washers are cut is completed, and the said cam $n^7$ is slightly reduced in diameter, as shown at 10, to permit the cutter to be slightly withdrawn radially before it is moved toward the face of the washer, so that the beveled edge of the washer is not acted upon in the latter movement.

One of the centers $n^2$ of the cutter-clamp is longitudinally adjustable on the spindle $o$, it being locked, when properly adjusted, by a check-nut, and the cutter is thus held firmly without lost motion relative to the washer being cut.

I claim—

1. In a machine for finishing metal washers, the following elements in combination, namely: a hopper to contain the blanks to be finished, a roadway which receives the blanks edgewise, a transferring device provided with jaws which embrace the blank at its edges as it comes from said roadway, mechanism for moving the said transferring device and blank held thereby, and a rotating spindle and chuck which engages and holds the blank by its central opening, leaving its face and edges exposed, and a cutter which acts upon the blank when held and rotated by the said chuck, substantially as described.

2. The roadway which contains washer-blanks held edgewise therein, and a transferring device provided with jaws which engage each blank at its edges as it drops from the roadway, combined with a chuck which enters and engages the blanks in their central opening while held in the transferring device, substantially as described.

3. The roadway for washer-blanks, combined with the transferring device consisting of a pivoted segmental block provided with blank-holding jaws, and having an oscillating movement by which the said jaws are placed under and removed from the end of the roadway, the segmental block closing the end of the roadway, and forming a support for the column of blanks therein while the jaws are being moved toward and from the end of the roadway, substantially as described.

4. The roadway which holds the washer-blanks in a column edge to edge, combined with the transferring device having pivoted spring-pressed jaws which engage a blank around its edges as it falls from the roadway, and actuating mechanism which automatically opens the said jaws when beneath the end of the roadway, and subsequently moves the transferring device and blank held therein, substantially as and for the purpose described.

5. The transferring device provided with a holding device which embraces a washer-blank at its edges, combined with a chuck which engages the said blank at its central opening, and with mechanism which automatically operates the said transferring device and chuck, whereby the blank is applied to and engaged by the said chuck, substantially as described.

6. The spindle and chuck thereon which engages a washer-blank at its central opening, combined with the cutter and actuating mechanism therefor, whereby it is automatically caused to act upon the said blank, and is then withdrawn while a new blank is being applied to the chuck, substantially as described.

7. The receptacle for washer-blanks and roadway leading therefrom, combined with the transferring device, having spring-pressed jaws which receive the blanks singly from the said roadway, and the plunger which conveys the blanks from the receptacle to the roadway, and actuating mechanism common to the said plunger, and the jaws of the transferring device, substantially as described.

8. The chuck consisting of pivoted levers or jaws provided with fingers to enter the opening of the washer-blank, combined with mechanism to automatically operate the said levers, substantially as described.

9. The rotating spindle and chuck to engage and hold a washer-blank thereon with its face and edges exposed, combined with the cutter and cutter-clamp, and mechanism for feeding it against the washer held on the said spindle, substantially as described.

10. The rotating spindle and chuck which engages and holds a washer-blank thereon with its face and edge exposed, combined with the cutter-clamp and cutter, and actuating mechanism therefor, whereby the cutter is moved laterally and axially toward the blank to finish its edge and face, substantially as described.

11. The spindle and chuck consisting of jaws or levers having fulcrum-recesses in their adjacent sides and a fulcrum-pin common to both jaws in the spindle, and means to hold the said jaws engaged with the said fulcrum-pin, combined with the actuating-collar for the said jaws and its actuating-cam and shipper, substantially as described.

12. The cutter-clamp and its supporting centers and spindle, combined with cams and connecting mechanism, whereby the said clamp receives a rocking movement on its centers, and the said spindle receives an independent longitudinal movement, substantially as and for the purpose described.

In testimony whereof I have signed my name to this specification in the presence of two subscribing witnesses.

GEORGE W. GRIFFIN.

Witnesses:
JOS. P. LIVERMORE,
W. H. SIGSTON.